United States Patent [19]

Cosentino et al.

[11] 4,010,110

[45] Mar. 1, 1977

[54] PROCESS FOR DISPERSING CONTAMINANTS IN CIRCULATING WATER OR POLAR ORGANIC LIQUID SYSTEM

[75] Inventors: Joseph P. Cosentino, Nutley; Frederick R. Mahn, Verona, both of N.J.

[73] Assignee: Drew Chemical Corporation, Parsippany, N.J.

[22] Filed: Mar. 5, 1976

[21] Appl. No.: 664,073

Related U.S. Application Data

[62] Division of Ser. No. 169,820, Aug. 6, 1971, Pat. No. 3,962,119.

[52] U.S. Cl. .............................. 252/314; 252/89 R; 252/180; 252/310; 252/312; 252/321; 252/351; 252/358; 252/DIG. 1

[51] Int. Cl.² .......................................... B01J 13/00

[58] Field of Search ............. 252/351, DIG. 1, 180, 252/89 R, 312, 314

[56] References Cited

UNITED STATES PATENTS

| | | | |
|---|---|---|---|
| 2,677,700 | 5/1954 | Jackson et al. | 252/356 X |
| 2,834,748 | 5/1958 | Bailey et al. | 260/825 |
| 2,970,150 | 1/1961 | Bailey | 260/348 SC |
| 3,036,130 | 5/1962 | Jackson et al. | 252/351 X |
| 3,194,770 | 7/1965 | Hostettler | 252/431 R |
| 3,505,237 | 4/1970 | Steinhauer | 252/180 |

*Primary Examiner*—Richard D. Lovering
*Attorney, Agent, or Firm*—Marn & Jangarathis

[57] ABSTRACT

A dispersant composition comprising (1) a polysiloxane-polyoxyalkylene copolymer; and (2) an oxyalkylene polymer, in which the oxyalkylene of (1) and (2) is oxyethylene and/or oxypropylene. The composition disperses contaminants in aqueous systems without foaming, and also cleanses fouled surfaces.

11 Claims, No Drawings

PROCESS FOR DISPERSING CONTAMINANTS IN CIRCULATING WATER OR POLAR ORGANIC LIQUID SYSTEM

This is a division of application Ser. No. 169,820, filed Aug. 6, 1971 and now U.S. Pat. No. 3,962,119.

This invention relates to a dispersant composition and the utilization thereof. More particularly, this invention relates to a composition and a method for eliminating fouling in water systems.

In many systems, contamination and fouling present a severe problem. Thus, for example, in cooling water systems used for example in air conditioning, various process cooling and the like, contamination of the cooling water with various liquid and solid foulants, such as oils, presents serious problems in that such foulants coat and foul heat transfer surfaces.

There have been many attempts to eliminate such fouling, but in general, such attempts have met with only limited success as a result of either excessive foaming or incompatibility with various additives, such as corrosion inhibitors or biocides, which are present in the cooling water.

An object of this invention is to provide a new and improved dispersant composition.

Another object of this invention is to provide a composition which is capable of dispersing foulants and/or cleaning fouled surfaces.

A further object of this invention is to provide for such dispersing and/or cleaning without foaming.

These and other objects of the invention should be more readily apparent from reading the following detailed description thereof.

The objects of this invention are broadly accomplished by providing a dispersant composition comprised of: (1) a polysiloxane-polyoxyalkylene copolymer in which the oxyalkylene is either oxyethylene and/or oxypropylene; and (2) an oxyalkylene polymer in which the oxyalkylene is either oxyethylene and/or oxypropylene. The two components are preferably compatible with each other; i.e., the two components form a homogeneous mixture. The use of such a composition has been found to both eliminate fouling and effect cleaning of previously fouled surfaces.

The siloxane-oxyalkylene copolymer comprises predominantly dihydrocarbyl polysiloxane units and polyoxyalkylene units and may contain one or more, and preferably not more than two or three monohydrocarbyl siloxane units (i.e., not more than two or three bifunctional silicon atoms). Normally, the siloxane units are present in combinations of one or more units forming a chain which comprises the polysiloxane block or blocks of the copolymer.

Thus, one type of block copolymer adapted for use in the surfactant systems as a component in the compositions of this invention can be represented by the following general formula:

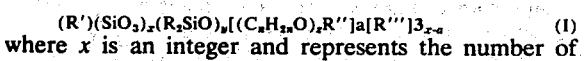

where $x$ is an integer and represents the number of trifunctional silicon atoms bonded to a single monovalent or multivalent hydrocarbyl radical, R'; $a$ is an integer and represents the number of polyoxyalkylene chains in the block copolymer; $y$ is an integer having a value of at least 3 and denotes the number of difunctional siloxane units, $n$ is 2 or 3 denoting the number of carbon atoms in the oxyalkylene group; and $z$ is an integer having a value of at least 5 and denotes the length of the oxyalkylene chain. It will be understood further that the surfactant compositions are mixtures of such block copolymers wherein $y$ and $z$ are of different values and that methods of determining the chain length of the polysiloxane chains and the polyoxyalkylene chains give values which represent average chain lengths. In the above formula, R and R'' represent monovalent hydrocarbyl radicals, such as alkyl, aryl or aralkyl radicals, and R'' terminates a polyoxyalkylene chain with a monoether group, R''' is an alkyl radical or a trihydrocarbylsilyl radical and may terminate a siloxane chain, and R' represents a monovalent or polyvalent hydrocarbyl radical, being monovalent when $x$ is 1, divalent when $x$ is 2, trivalent when $x$ is 3, tetravalent when $x$ is 4.

With reference to Formula I above, there is at least one oxyalkylene chain joined to a siloxane chain through a Si—O—C bond, and when $a = 1$ and $x = 1$, there are two alkyl or trihydrocarbylsilyl groups R''' terminating siloxane chains. However, when $a = 3$ and $x = 1$, there are no such groups present.

One type of block copolymer is represented when $x$ in Formula I is 1, and in this instance, a branched-chain formula may be postulated as follows:

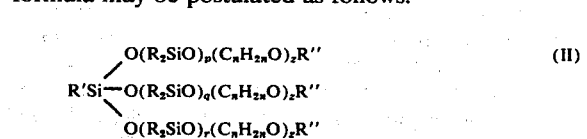

where $p+q+r=y$ of Formula I and has a minimum value of 3, the other subscripts being the same as in Formula I. In this instance, all three of the oxyalkylene chains are joined to the end of polysiloxane chains of the type —(R₂SiO)—. A representative composition of the type of compounds or products characterized by Formula II above is a composition wherein the values of $p$, $q$ and $r$ are 6 and the $(C_nH_{2n}O)_z$ unit represents a mixed polyoxyethylene-oxypropylene block containing 17 oxyethylene units and 13 oxypropylene units and R'' represents a butyl group. Another composition of the class represented by Formula II above is a composition wherein the values of $p$, $q$ and $r$ are 3 and the $(C_nH_{2n}O)_z$ unit represents a polyoxyethylene block containing 16 oxyethylene units and R'' represents a methyl group. Still another composition of the class described is a product wherein the values of $p$, $q$ and $r$ are 3 and the $(C_nH_{2n}O)_z$ unit is a polyoxypropylene block containing from 12 to 13 oxypropylene units and R'' represents a butyl group.

However, another type of branched-chain block copolymer exists when one of the oxyalkylene chains is attached through an oxygen atom to the trifunctional silicon atom bonded only to a single hydrocarbyl radical (R'). This formula may be given as follows:

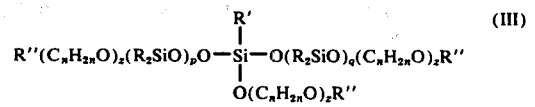

where $p+q=y$ of Formula I and has a minimum value of 3.

Another type of block copolymer is represented when there are present therein two trifunctional silicon atoms each bonded to a single divalent hydrocarbon radical, and correspondingly present therein six polyoxyalkylene chains. Such block copolymers may be represented by the formula:

$$(O_3SiR'SiO_3)(R_2SiO)_y[(C_nH_{2n}O)_zR'']_a \quad (IV)$$

wherein R, R'', y, n and z are as designated for Formula I, and R' is a divalent hydrocarbon radical. Expressed in structural form these block copolymers may be represented by the following formula:

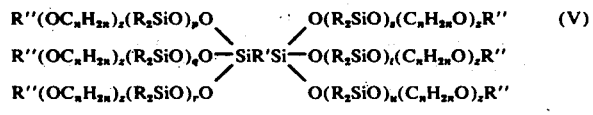

where $p+q+r+s+t+u$ is equal to y of Formula I and in this instance has a minimum value of 6.

Other siloxane-oxyalkylene block copolymers which deserve mention are those corresponding to the general formula:

$$R'[(R_2SiO)_y]_a[(C_nH_{2n}O)_x]_bR'' \quad (VI)$$

where y is an integer having a value of at least 2 and denotes the number of siloxane units, n is 2 or 3 denoting the number of carbon atoms in the oxyalkylene group, x is an integer having a value of at least 5 and denotes the length of the oxyalkylene chain, and a and b are integers whose sum is 2 or 3. R' and R'' are chain-terminating monovalent hydrocarbyl or hydrocarbyloxy radicals, and may terminate a siloxane chain either by a hydrocarbyloxy group or by completing a trihydrocarbylsilyl group and may terminate an oxyalkylene chain with a hydrocarbyloxy group. It will be understood further that the compositions of matter are mixtures of such block copolymers wherein x and y are of different values and that methods of determining the chain length of the polysiloxane chains and the polyoxyalkylene chains give values which represent average chain lengths.

With reference to Formula VI above, it will be noted that there is at least one oxyalkylene chain or block joined to at least one siloxane chain or block through a Si—O—C bond, and different types of block copolymers are formed depending on the values of a and b.

In one type, there is one block of siloxane polymer (a is 1) and two blocks of oxyalkylene polymer (b is 2) and such type may be represented as follows:

$$R'O(C_nH_{2n}O)_x(R_2SiO)_y(C_nH_{2n}O)_xR'' \quad (VII)$$

where the subscripts are as defined in Formula VI above and R' and R'' are monovalent hydrocarbyl radicals.

In another type of block copolymer, there is one block of oxyalkylene polymer (bis 1) and two blocks of siloxane polymer (a is 2) and this type may be represented as follows:

$$R'(R_2SiO)_y(C_nH_{2n}O)_x(R_2SiO)_{y-1}R_2SiR'' \quad (VIII)$$

where R' and R'' are monovalent hydrocarbyl or hydrocarbyloxy radicals, and the other subscripts are as defined in Formula VI.

In a third type of block copolymer, there is one block of a siloxane polymer and one block of an oxyalkylene polymer (a and b both equal 1), and this type may be represented as follows:

$$R'(R_2SiO)_y(C_nH_{2n}O)_zR'' \quad (IX)$$

where R' and R'' are monovalent hydrocarbyl or hydrocarbyloxy radicals.

Still other polysiloxane-oxyalkylene surfactant systems useful as components of the compositions of this invention are those containing the aforesaid copolymers characterized by the following general formula:

$$R'O[C_nH_{2n}O)_y]_c[(R_2SiO)_x(C_nH_{2n}O)_y]_d[(R_2SiO)_x]_eR' \quad (X)$$

in which R' is hydrogen when attached to oxyalkylene polymers and a monovalent alkyl group when attached to siloxane polymers; R is a monovalent hydrocarbyl group and which can be the same or different for all R's in the molecule; x is an integer of 2 or more; y is an integer of 5 or more; n is 2 or 3; and a and b are integers each of which is equal to at least 1; c and e are integers having a value of 0 or 1; and d is an integer of a value of 1 or of a greater value. The symbol R', as used in this formula, represents a monovalent chain-terminating group which is hydrogen when terminating an oxyalkylene block end of the copolymeric chain. When terminating a silicone block end of the copolymeric chain, R' is an alkyl group. Whether or not the terminal groups are hydrogen or alkyl apparently has little if any influence on the important properties and utility as emulsifiers.

Included within the scope of Formula X are block copolymers wherein the integers c and e are both equal to 0 and the integer d is a value of 1 or more, the general formula of the type being:

$$R''[(R_2SiO)_x(C_nH_{2n}O)_y]_dH \quad (XI)$$

wherein R'' designates a monovalent alkyl group, R represents a monovalent hydrocarbyl group; and x, y, n and d represent integers as defined in Formula X.

Referring to Formula X, a second type of organo-silicone block copolymer is one in which c equals 1, e equals 0 and d has a value of 1 or more, the general formula of this type being:

$$HO(C_nH_{2n}O)_y[R_2SiO)_x(C_nH_{2n}O)_y]_dH \quad (XII)$$

wherein R designates a hydrocarbyl group; and x, y, n and d are integers having the same definitions as for those of like designations in Formula X.

A third type of organo-silicone block copolymer is characterized by siloxane blocks at each end of the copolymeric chain and can be represented by Formula X when c is equal to 0, e has a value of 1 and d represents an integer of at least 1. This type of block copolymer is more particularly illustrated by the general formula:

$$R''O[(R_2SiO)_x(C_nH_{2n}O)_y]_d(R_2SiO)_xR'' \quad (XIII)$$

wherein R designates a hydrocarbyl group; R'' is an alkyl group; and x, y, n and d are integers having the same value as provided for in Formula X.

Another group of polysiloxane-oxyalkylene block copolymer surfactant systems which deserve mention are mixtures of block copolymers wherein each copolymer contains at least one siloxane polymer and at least one oxyalkylene polymer in combination, the siloxane polymer being comprised of at least one trifunctional silicon atom bonded to three oxygen atoms and a hydrocarbyl group and joined to at least one oxyalkylene polymer through a carbon-oxysilicon bond and the oxyalkylene polymer being composed of at least 5 oxyalkylene units joined to each other by oxycarbon bonds and joined at least at one end to a siloxane polymer through a carbon-oxysilicon bond.

In hereinabove formulas I–XIII R is generally methyl, ethyl or propyl, preferably methyl, and R'' is preferably alkyl.

The preferred copolymer is one which includes both oxyethylene and oxypropylene units in the polymer chain. A particularly preferred copolymer is one in which in structural formula II, R' is ethyl, R is methyl, R'' is butyl and $(C_nH_{2n}O)_2$ is a mixed polyoxyethylene-oxypropylene block.

These copolymers are described in U.S. Pat. Nos. 3,194,770; 2,834,748; and 2,917,480 which are hereby incorporated by reference.

A further type of polysiloxane-polyoxyalkylene copolymer is one represented by the following structural formula:

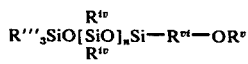

wherein $R^v$ is an oxyalkylene polymer chain in which the oxyalkylene is oxyethylene and/or oxypropylene; $R'''$ is a hydrocarbon radical; $R^{iv}$ is alkyl preferably having 1–3 carbon atoms and most preferably methyl; $R^{vi}$ is lower alkylene; and $n$ is an integer greater than 1. These compounds may be prepared by reaction between an unsaturated ether of a polyoxyalkylene glycol and a siloxane containing silane hydrogen. Such a procedure is described in U.S. Pat. No. 2,970,150 which is hereby incorporated by reference. A particularly preferred polymer is one in which $R'''$ is lower alkyl (1–4 carbon atoms), $R^{iv}$ is methyl and $R^v$ is a block copolymer of oxyethylene-oxypropylene, and $R^{vi}$ is propylene.

The oxyalkylene polymer component of the composition is either a polymer of oxyethylene, a polymer of oxypropylene or a copolymer of oxyethylene and oxypropylene, preferably a block copolymer of oxyethylene and oxypropylene. The oxypropylene polymer may be either a polyoxyalkylene glycol, polyoxyethylene alcohol; a polyoxyalkylene phenol, a polyoxyalkylene carboxylic acid, ester, a polyoxyalkylene amine or polyoxyalkylene amide. The oxyalkylene polymers may be represented by the following structural formula:

wherein
 $n$ is 2 or 3
 Y is either —OH or the residue of an organic compound containing therein a hydrogen atom capable of reacting with a 1,2 alkylene oxide; and
 A is either hydrogen or an organic radical, preferably hydrogen and $x$ is an integer greater than 1.
As representative examples of Y + A there may be mentioned the residues of: hydrocarbon alcohols, hydrocarbon phenols, hydrocarbon carboxylic acids (preferably alkanoic and alkenoic acids), hydrocarbon amines (preferably alkyl amines), hydrocarbon amides (preferably alkyl amides). The hydrocarbon radical preferably has from 2–20 carbon atoms and more preferably from 4–16 carbon atoms. The hydrocarbon groups may also be substituted with various substituent groups such as chloro, bromo, nitro, alkoxy etc. The term hydrocarbon as used herein includes both aliphatic and aromatic hydrocarbons and the hydrocarbon radical may be: alkyl, alkenyl, cycloalkyl, aralkyl or alkaryl or aryl.

The preferred oxyalkylene polymer contains blocks of both oxyethylene and oxypropylene.

As representative samples of oxyalkylene polymers which may be used for the purposes of the present invention there may be mentioned: polyethylene glycol; a copolymer of polyethylene and polypropylene glycol; the reaction product of various $C_4-C_{16}$ alkanols such as butanol, oleyl alcohol, etc., with a propylene and ethylene oxide to produce mono- and di-terminated esters; reaction product of alkyl phenols such as iso-octylphenol with propylene and ethylene oxide to produce mono- and di-terminated ethers; poly-ethylene and propylene glycol esters (both mono- and di-esters) of various hydrocarbon carboxylic acids; in particular the fatty acids such as stearic acid, oleic acid, palmitic acid; etc; poly (ethylene and propylene glycols) in which one hydroxyl group is esterified with a hydrocarbon carboxylic acid and the other hydroxyl group is etherified with an alkanol such as butoxy poly (ethylene - propylene glycol) mono-stearate. A particularly preferred polymer is a butoxy terminated block copolymer of oxyethylene and oxypropylene.

The oxyalkylene polymer component of the composition provides the wetting properties and preferably includes blocks of both oxypropylene and oxyethylene. The oxyethylene moiety provides the emulsifying properties as a result of its high hydrophillicity. The oxypropylene moiety provides foam control and also decreases the overall solubility of the component. Accordingly, the ratio of oxypropylene to oxyethylene may be controlled to vary the overall properties of this non-ionic surfactant. In general, the polyoxyalkylene component has a molecular weight from about 500 to about 5000, preferably from about 1000 to about 2000.

The siloxane-oxyalkylene copolymer component of the composition is hydrophobic and reduces the surface tension. In addition, the siloxane-oxyalkylene copolymer component reduces and/or eliminates foaming. In general, the siloxane-oxyalkylene copolymer employed generally has a molecular weight from about 500 to about 10,000 and preferably from about 1000 to about 5000.

The relative proportions of the two components of the composition may vary over a wide range, but in general, the siloxane-oxyalkylene copolymer comprises from about 0.1 to about 25 parts, preferably from about 0.1 to about 10 parts, per 100 parts of the two components, all by weight.

The two-component composition of the present invention may be used alone or may be dispersed in water or polar organic solvent such as lower alkanol, dimethyl sulfoxide, dioxane, demethyl formamide, sulfolane, etc. The water of polar organic solvent functions as merely a diluent or dispersant to facilitate handling of the composition. The composition may also include other additives, such as colorants, odorants, etc., which do not change the overall properties of the composition.

The composition of the present invention may be employed for dispersing a solid or liquid contaminant in either water or polar organic solvent, preferably water. In addition, the composition effectively cleans such solid or liquid contaminants from surfaces on which the contaminant has previously been deposited and, accordingly, the composition functions as both a cleaner and a dispersant. The term "contaminant" as used herein includes any component which is not readily dispersible in the water or polar organic solvent and includes, but is not limited to: edible oils, needle oils, lubricating oils, silt, mud, sludge, clay and the like. In addition, the composition effectively disperse solid substances, such as tobacco dust, which may be entrained in a water system.

The compositions are preferably employed in aqueous systems; e.g., the cooling water for air conditioning systems; process cooling systems in which cooling water is circulated through heat exchangers and/or cooling towers. The water becomes contaminated with various substances either through leaks in the cooling system, in the case where water is used for indirect heat exchange, or as a result of the water being cooled in an open cooling tower. Thus, for example, in many air conditioning systems employing cooling water, the cooling water is circulated through a cooling tower and becomes contaminated by substances in the surrounding atmosphere. The compositions of the present invention, upon being added to such water, cleanse previously contaminated surface and prevent future fouling of such surfaces by maintaining the contaminants dispersed in the water. In this manner, fouling of the heat exchange surface is prevented, and heat transfer efficiencies are maintained.

Although the compositions are preferably employed in aqueous systems, it is to be understood that the compositions may be utilized in systems employing polar organic solvents with similar results.

The compositions of the present invention may be employed in the system in concentrations of less than 1% and will perform the function of dispersing and preventing the deposition of contaminants on surfaces. In addition, the composition cleans fouled surfaces, and such factors are effected without foaming. The composition has been found to be effective at concentrations of as little as 2000 ppm., and even as little as 200 ppm.

The following examples further illustrate the present invention, but it is to be understood that the scope of the invention is not to be limited thereby. Unless otherwise specified all parts and percentages are by weight.

EXAMPLE I

A. A composition is prepared by mixing 14 parts of butoxy terminated poly (oxyethylene-oxypropylene) comprised of equal parts of oxyethylene and oxypropylene blocks (UCON 5100 sold by Union Carbide) with 1 part of L-520 silicone sold by Union Carbide; a copolymer of triethoxy end blocked branched chain dimethyl polysiloxane and butoxy end blocked polyoxyethylene oxypropylene glycol, i.e., a copolymer having the following structural formula II:

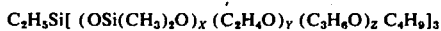

The resulting mixture is combined with 85 parts of water, and 0.2 parts of sodium lignosulfonate (CHELIG 32) as a colorant.

B. The composition prepared in (A) is added in an amount of 2000 ppm. to water circulating through a cooling tower which has accumulated thick oily (almost like pitch) deposits on the wood members, carrying lines and heat exchangers. The composition stripped the deposits from surfaces. After 20 hours the system is drained and inspected. The oil deposits in the heat exchanger are gone. The distribution lines are clean, and the tower basin previously containing 6 inches of the grease is almost totally clean. The cleansing is effected without foaming.

C. The composition of (A) added to water in an amount of 200 ppm. totally emulsified, without foaming, 2000 ppm. of motor oil.

D. The composition of (A) is added in an amount of 200 ppm. to the cooling water of an air conditioning system used in a tobacco processing plant, and effectively dispersed tobacco dust in the cooling water. Prior to use of the composition, tobacco dust caused fouling of surfaces in the system.

EXAMPLE II

The following compositions are found to be effective as a dispersing and emulsifying aid and for preventing deposits of contaminants in water.

| | | Parts |
|---|---|---|
| A. | (1) Ethylene glycol - Propylene Glycol Copolymer (M.W. 2000) | 14.5 |
| | (2) L-520 Silicone Oil | 0.5 |
| | (3) Water | 85 |
| B. | (1) Poly (ethylene glycol -M.W. 1000) | 24 |
| | (2) L-520 | 1 |
| | (3) Water | 75 |
| C. | (1) Di butoxy poly (oxyethylene-oxypropylene) | 14 |
| | (2) L-530 Silicone Oil Sold by Union Carbide (a reaction product of poly (dimethyl siloxane) containing silane hydrogen and an unsaturated ether of a block copolymer of oxyethylene oxypropylene | 1 |
| | (3) Water | 85 |

Numerous modifications and variations of the present invention are possible in light of the above teachings and, accordingly, within the scope of the appended claims the invention may be practiced otherwise than as particularly described.

What is claimed is:

1. A process for dispersing contaminants in a circulating water or polar organic liquid system, comprising:
   adding to the system a dispersing composition consisting essentially of:
   a. an oxyalkylene polymer having a molecular weight from about 500 to about 5000 wherein the recurring units consist of a member selected from the group consisting of oxypropylene, oxyethylene and mixtures thereof; and
   b. a polysiloxane-polyoxyalkalene block copolymer having a molecular weight from about 500 to about 10,000 wherein the polysiloxane block consists essentially of recurring units of a dialkyl siloxane wherein the alkyl group has from 1 –3 carbon atoms and the oxyalkylene block consists essentially of recurring units of a member selected from the group consisting of oxypropylene, oxyethylene and mixtures thereof, said components (a) and (b) being present in an amount effective to disperse contaminants in aqueous and polar organic liquid systems.

2. The process of claim 1 wherein the composition is added to the liquid in an amount of less than 1%.

3. The process of claim 2 wherein the composition is added to a circulating cooling system.

4. The process of claim 2 wherein the siloxane-oxyalkylene copolymer is present in an amount from about 0.1 to about 25 parts by weight per 100 parts of the two components.

5. The process of claim 4 wherein the oxyalkylene polymer is a block copolymer of oxyethylene and oxypropylene.

6. The process of claim 5 wherein the dialkyl siloxane units of component (b) are dimethyl siloxane units.

7. The process of claim 6 wherein the polysiloxane-polyoxyalkylene copolymer has the following formula:

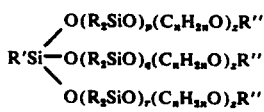

wherein R' and R'' are alkyl; $R_2$ is methyl, $z$ is an integer of at least 5, $p$, $q$ and $r$ are integers and $C_nH_{2n}O$ is selected from the group consisting of oxypropylene, oxyethylene and mixtures thereof.

8. The process of claim 6 wherein the polysiloxane-polyoxyalkylene copolymer has the following structural formula:

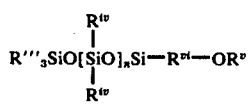

wherein $R'''$ is lower alkyl, $R^{iv}$ is methyl, $R^{vi}$ is lower alkylene and $R^v$ is selected from the group consisting of oxypropylene, oxyethylene and mixtures thereof.

9. The process of claim 6 wherein the polysiloxane-polyoxyalkylene copolymer is a copolymer of triethoxy end blocked branched chain dimethyl polysiloxane and a butoxy end blocked polyoxyethylene-oxypropylene glycol.

10. The process of claim 1 wherein the oxyalkylene polymer has the following structural formula:

$$Y[C_nH_{2n}O]_xH$$

wherein: Y is selected from the group consisting of hydrogen and a residue of a member selected from the group consisting of substituted and unsubstituted hydrocarbon alcohols, hydrocarbon phenols, hydrocarbon carboxylic acids, hydrocarbon amines, hydrocarbon amides and wherein the substituent group is selected from the group consisting of chloro, bromo and nitro, and $n$ is $2-3$ and $x$ is an integer greater than 1.

11. The process of claim 6 wherein the oxyalkylene block of component (b) is a mixture of oxypropylene and oxyethylene.

* * * * *